United States Patent [19]

Kanafani et al.

[11] Patent Number: 4,847,100

[45] Date of Patent: Jul. 11, 1989

[54] CONTROL OF SYMMETRY OF MICROWAVE CAKES

[75] Inventors: Hanny Kanafani, Champlin; Bruce M. Patrick, Richfield; William A. Atwell, Andover, all of Minn.

[73] Assignee: The Pillsbury Co., Minneapolis, Minn.

[21] Appl. No.: 113,134

[22] Filed: Oct. 27, 1987

[51] Int. Cl.⁴ .................. A23D 10/04; A23D 8/00
[52] U.S. Cl. ........................... 426/243; 426/553; 426/554; 426/562; 426/563
[58] Field of Search ............. 426/243, 241, 242, 552, 426/553, 554, 561–563

[56] References Cited

U.S. PATENT DOCUMENTS

| | | | |
|---|---|---|---|
| 3,615,683 | 10/1971 | Hoynak | 426/241 |
| 4,396,635 | 8/1983 | Roudebush et al. | 426/243 |
| 4,419,377 | 12/1983 | Seward et al. | 426/554 |
| 4,515,824 | 5/1985 | Blake et al. | 426/554 |

*Primary Examiner*—R. B. Penland
*Attorney, Agent, or Firm*—R. J. Lewis

[57] ABSTRACT

A culinary mix is provided for baking in a microwave oven wherein the amount of leavening agent is controlled to control the symmetry of the baked layer.

14 Claims, 9 Drawing Sheets

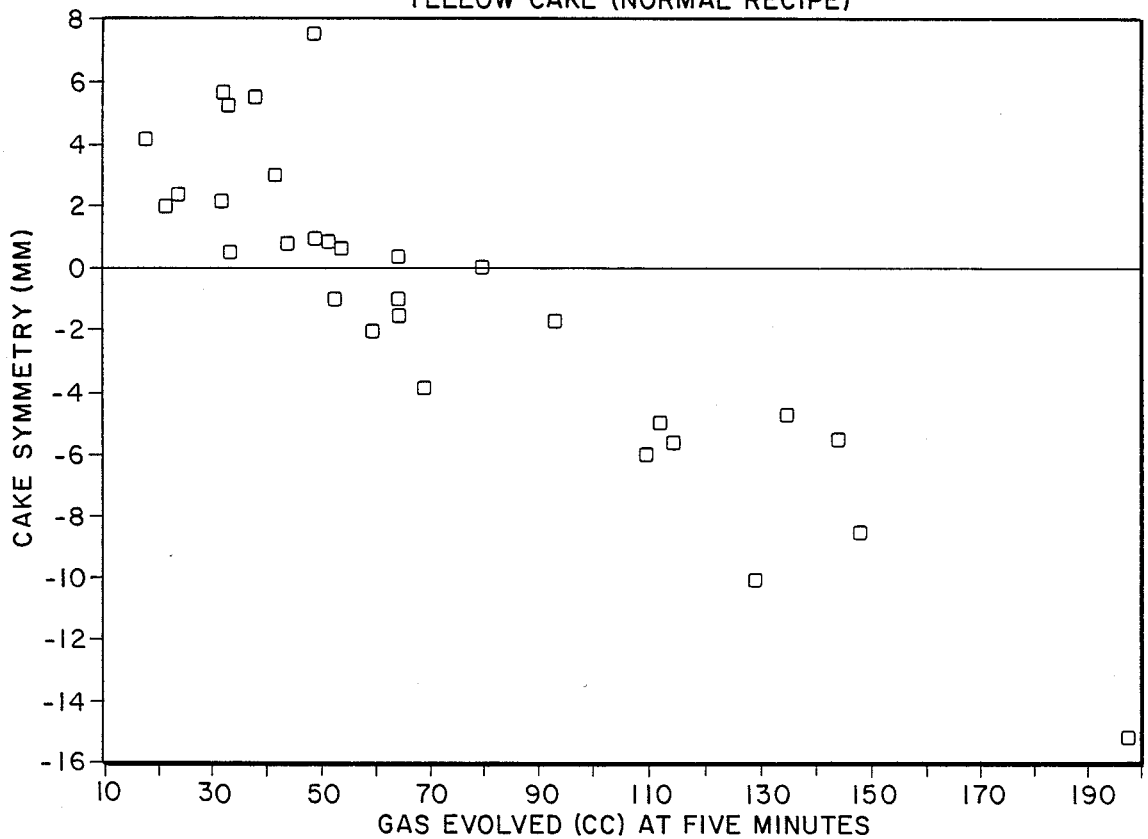
*Fig.-1* CAKE SYMMETRY VS. GAS EVOLUTION
YELLOW CAKE (NORMAL RECIPE)
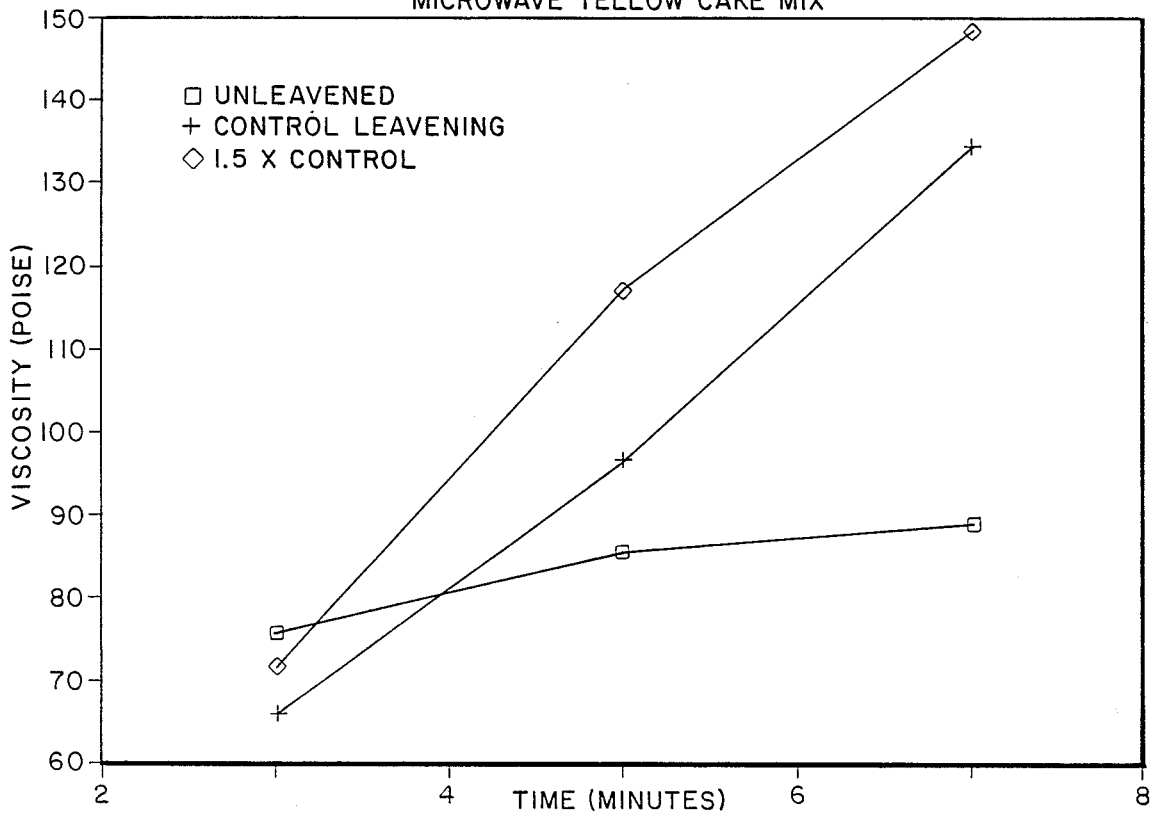
*Fig.-2* VISCOSITY VERSUS TIME
MICROWAVE YELLOW CAKE MIX

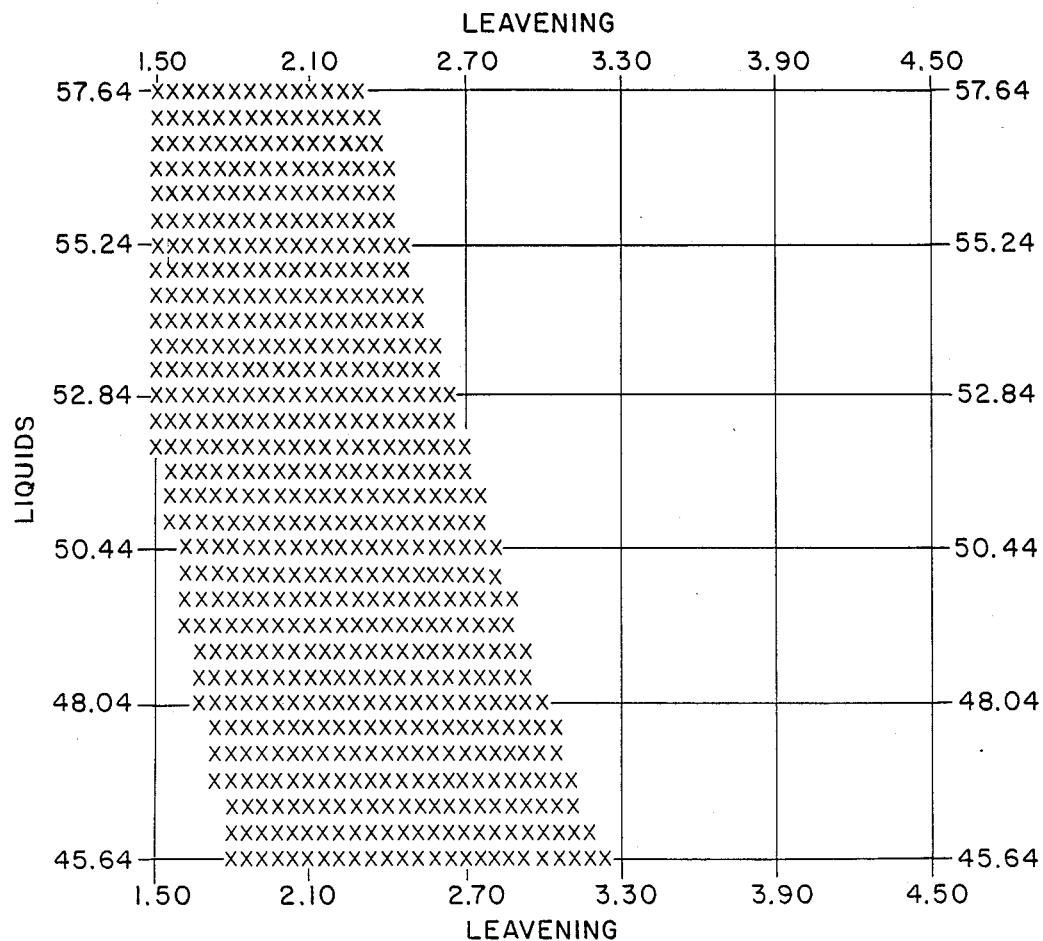

CONTROL OF SYMMETRY OF MICROWAVE CAKES

FIELD OF THE INVENTION

The present invention relates to a method of preparing cakes having a relatively uniform top surface in a microwave oven.

BACKGROUND OF THE INVENTION

The use of prepared mixes and batters has greatly simplified the task of preparing baked goods, particularly cakes which contain flour, sugar, shortening, leavening agents, and other minor ingredients. To prepare the mixes for consumption, aqueous ingredients such as water, milk, eggs, and the like are added to the mix and stirred to form a homogeneous batter. This batter is then baked to produce the final product. The use of such mixes avoids the problem of assembling the various ingredients required, measuring the desired quantities, and mixing them in specified proportions. It is also possible to assemble the dry mix components and the liquid components prior to delivery to the consumer, to further simplify the task of preparing baked goods.

When the culinary mixes designed for baking in a conventional oven by radiant heat are baked in a microwave oven, the resulting cakes are often unacceptable.

For example, during the development of the present invention, a shelf life related problem called crowning was observed. Crowning is defined as a deficiency in the symmetry of the final microwave baked cake where the top center (after inversion and removal from the pan) of the cake is elevated versus the sides as in FIG. 3A. Often this elevated region has a lip on one or more sides creating a very unacceptable appearance. It is to be noted that the top of the finished cake was next to the bottom of the microwave cake pan prior to inversion after the bake.

After considerable experimentation it was unexpectedly discovered that the leavening agents had a significant effect on the crowning problem. Leavening agent ratios, types, and levels needed to be adjusted away from those used in conventionally prepared systems. By adjusting the type and amounts of the leavening agents used, crowning during the shelf life of the microwave cake mixes was reduced, and in many cases, eliminated.

Crowning also occurs in products made from leavened batters that have been processed by mixing or pumping. In this case, it was discovered that crowning was caused by the loss of leavening during processing. After considering the effects of shelf life and processing on crowning, it was determined that gas evolution in the batter just prior to microwave preparation was most important. A test quantitating the amount of gas evolved from 100 grams of batter held at 50° C. for 5 minutes was developed and shown to correlate with an objective measurement of crowning specifically, but also cake symmetry in general (see FIGS. 1 and 6).

Since the crowning problem is not prevalent in conventional cake systems, the cause of this difference was the subject of study.

In conventional ovens, the process of cooking to the center of food masses by conduction and convection requires a temperature gradient, wherein surface temperatures are usually much higher than the final cooked temperature of the food. For example, a gas-fired oven may be maintained at 300° F. to 400° F. to produce a meat roast with an internal temperature of 140° F. In microwave cooking, on the other hand, the ambient temperature in the cooking space is approximately room temperature, and any rise in temperature is very small. The energy of the microwaves is immediately absorbed within the food mass being cooked, and the resulting increase in thermal energy in the food depends on an interaction between the microwave energy and the components of which the food is composed. This interaction can occur throughout the food mass, rapidly produces heat, and results in rapid cooking.

When cake batter is baked in a microwave oven, the microwave energy is unevenly delivered to the fluid batter. The edge of a microwave cake batter is irradiated from three directions, edge, top, and bottom, while the center of the microwave cake batter is irradiated primarily from only two directions. Consequently, heating is more rapid on the edge than in the center. Due to convective heat flow, while the batter is fluid, it rises on the edge and falls in the center. Similarly, because of the uneven heating, the edges reach the temperatures required to set the structure earlier in the baking process than the center. The phenomenon of starch gelatinization is generally considered responsible for setting the structure of a cake (cf. R. C. Hoseney, *Principles of Cereal Science and Technology*, A.A.C.C. Inc., page 272, 1986), although coagulation of the protein has been implicated as well (cf. Mizukoshi et al., *Cereal Chemistry* 56, (4), page 305, 1979; and *Cereal Chemistry* 57, page 352, 1980).

It was discovered that gas evolution affects the symmetry of a cake layer baked by microwaves. Symmetry is measured by measuring the final cake layer thickness in the center and at two opposite edges. The symmetry value is determined by obtaining the sum of the edge measurements and subtracting this from twice the center measurement. Generally, highly leavened batters have high viscosities. Where the batter is poorly leavened, the center of the cake is very fluid in the final stages of the microwave bake, and the downward flow of batter results in the batter flowing under the previously set edge, causing a positive symmetry known as crowning, shown in FIG. 3A. Optimally leavened batter yields perfect symmetry as shown in FIG. 3B. Overly leavened batter yields negative symmetry (FIG. 3C). Although the overly leavened microwave baking batters have high central viscosity, the center sets with an enlarged cell structure that collapses upon cooling.

Another phenomenon contributing to the symmetry of a microwave cake is the final moisture content of localized areas within the cake. It has been observed that overdone areas, i.e., low moisture areas, within the cake contract. This may be due to contraction of the starch gel that has developed in the cake during microwave cooking. In general, the edge areas are overdone because these areas receive radiation from the sides as well as the top and bottom.

In a highly leavened system, the edge areas evolve large amounts of gas which would tend to lower the relative dielectric constant and relative dielectric loss factor. The dielectric properties and the thickness of a uniform layer are believed to govern the heating rate of the layer. A more detailed discussion of this is found in U.S. patent application Ser. No. 903,007 and the CIP thereof, Ser. No. 85,125 filed Aug. 13, 1987, by Atwell et al. and entitled Microwave Food Product and Method, the disclosures of which are incorporated herein by reference. In general, lower values for the dielectric parameters yield lower heating rates. Thus, a highly leavened system should heat more slowly than a less leavened system. Slower baking translates to higher final moisture and less contraction, particularly in the highly irradiated edge areas. Less contraction around the edges tends to yield more negative symmetries and reduces the "crowning" phenomenon.

Roudebush et al., in U.S. Pat. No. 4,396,635, disclose a microwave cake mix wherein the leavening level is 1–5%, about 1.3% sodium bicarbonate and 1.7% acidulants. This level of leavening is said to provide the best height and texture.

Seward et al., in U.S. Pat. No. 4,419,377, disclose that in microwave cake mixes there is ideally a balance between fast and slow acting acidulants in a leavening system, but no reference is made to symmetry of the baked layers.

Blake et al., in U.S. Pat. No. 4,515,824, disclose a cake mix wherein the leavening agents range from 0.3 to 10%, but there is no reference to symmetry of the layers.

SUMMARY OF THE INVENTION

It is an object of the present invention to overcome the afore-mentioned deficiencies in the prior art.

It is another object of the present invention to control the geometry of microwave cakes.

It is yet a further object of the present invention to provide cake mixes which yield microwave cakes having a controlled geometry.

It has been found that by controlling the leavening in a microwave cake batter, the geometry of the baked cake layer can be controlled. The amount and ratio of leavening agents, primarily sodium bicarbonate (soda), monocalcium phosphate (MCP), and sodium aluminum phosphate (SALP), affect the symmetry of microwave cakes, particularly the yellow cakes.

It has been discovered that the gas evolution abilities of the batter in the condition it would be in just prior to microwave preparation are of primary importance in controlling the symmetry of microwave cakes. To control the amount of gas evolved, the amount, type, and ratio of the leavening agents present in the batter can be manipulated. Gas evolution and cake symmetry, as measured by the procedures described herein, correlate well (see FIG. 6). The symmetry deficiencies described herein are present for cakes made from batters that are baked in a microwave oven and are not observed in conventionally prepared cakes. Microwave ovens deliver energy in a manner that usually cause convection currents to flow upwards near the edges, and downwards in the center, of a layer cake batter. This pattern of batter flow is generally not prevalent in a batter prepared under conventional baking conditions. Symmetry deficiencies are primarily present in the top surface of the finished microwave cake. The top surface of the finished cake was next to the bottom surface of the microwave cake pan prior to inversion. The crowning phenomenon where the central surface of the top of the final cake is elevated versus the top edges is the most unacceptable symmetry deficiency. Crowning should be distinguished from "doming", which is a symmetry that is desirable in many products (e.g., muffins). Although doming also describes a symmetry where the central portion of the top is elevated, doming pertains to the top surface as baked, not the top surface after inversion. High gas evolution reduces crowning whereas it may enhance doming.

The leavening agents for use in the present invention can be any system of gas producers that yield gas evolution values as measured by the method described herein.

DETAILED DESCRIPTION OF THE DRAWINGS

FIG. 1 shows the relationship between gas evolution and cake symmetry for a yellow cake system.

FIG. 2 shows the relationship between gas evolution and batter viscosity for a yellow cake system.

Figure 4A:
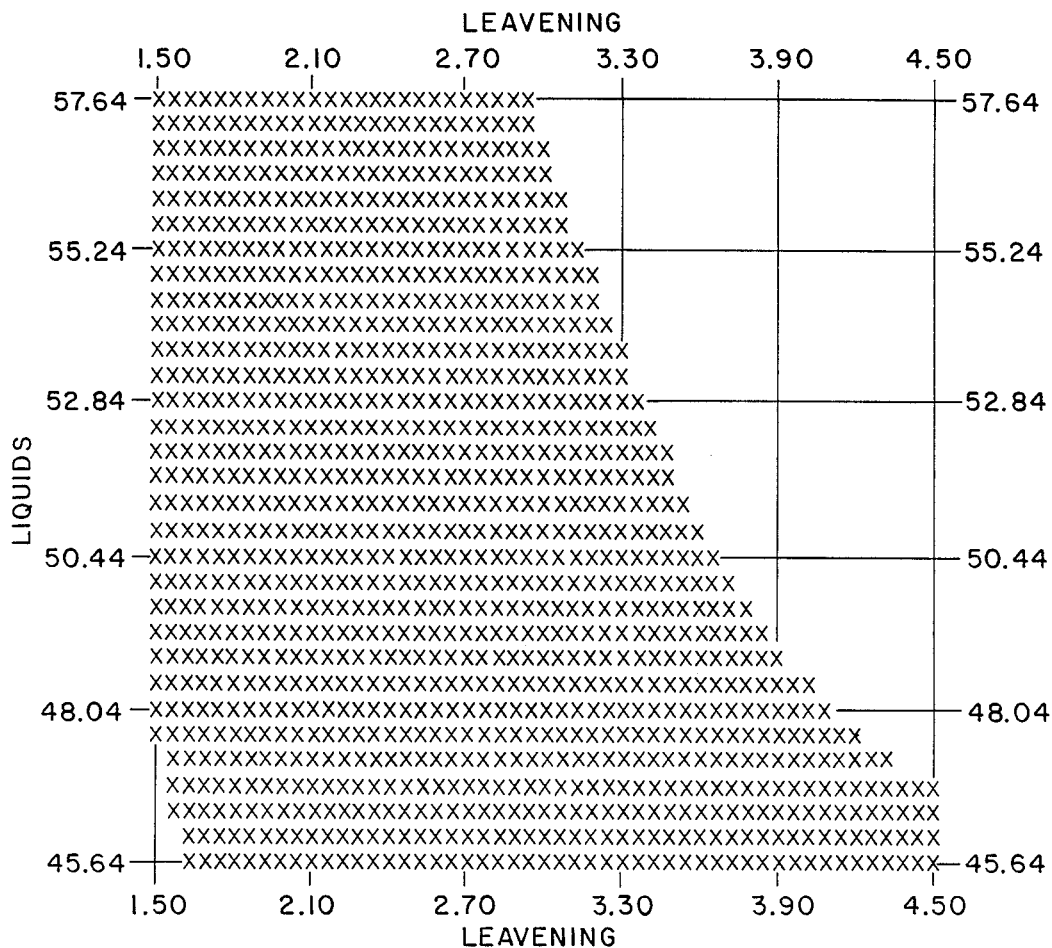
Figure 4C:
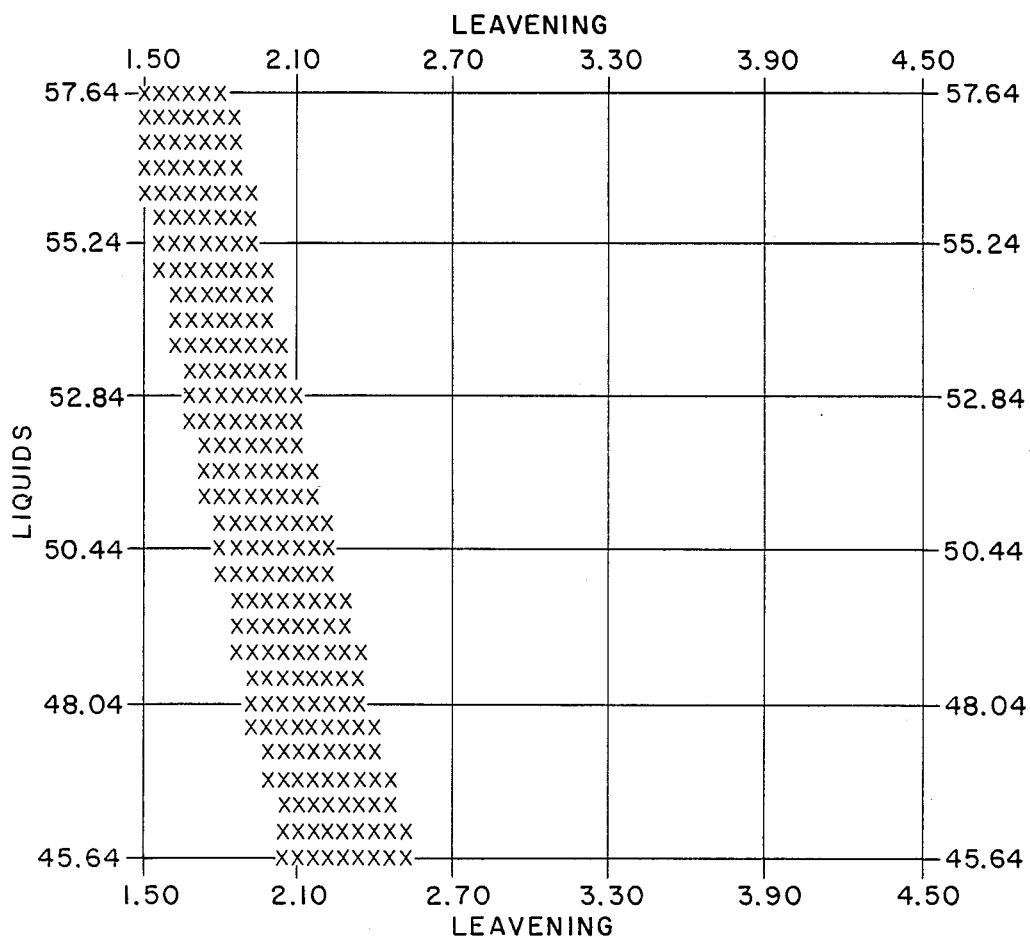

FIGS. 4A, 4B, and 4C show the relationship between total liquid addition to the recipe, total percent leavening, and cake symmetry for yellow cakes.

Figure 5A:
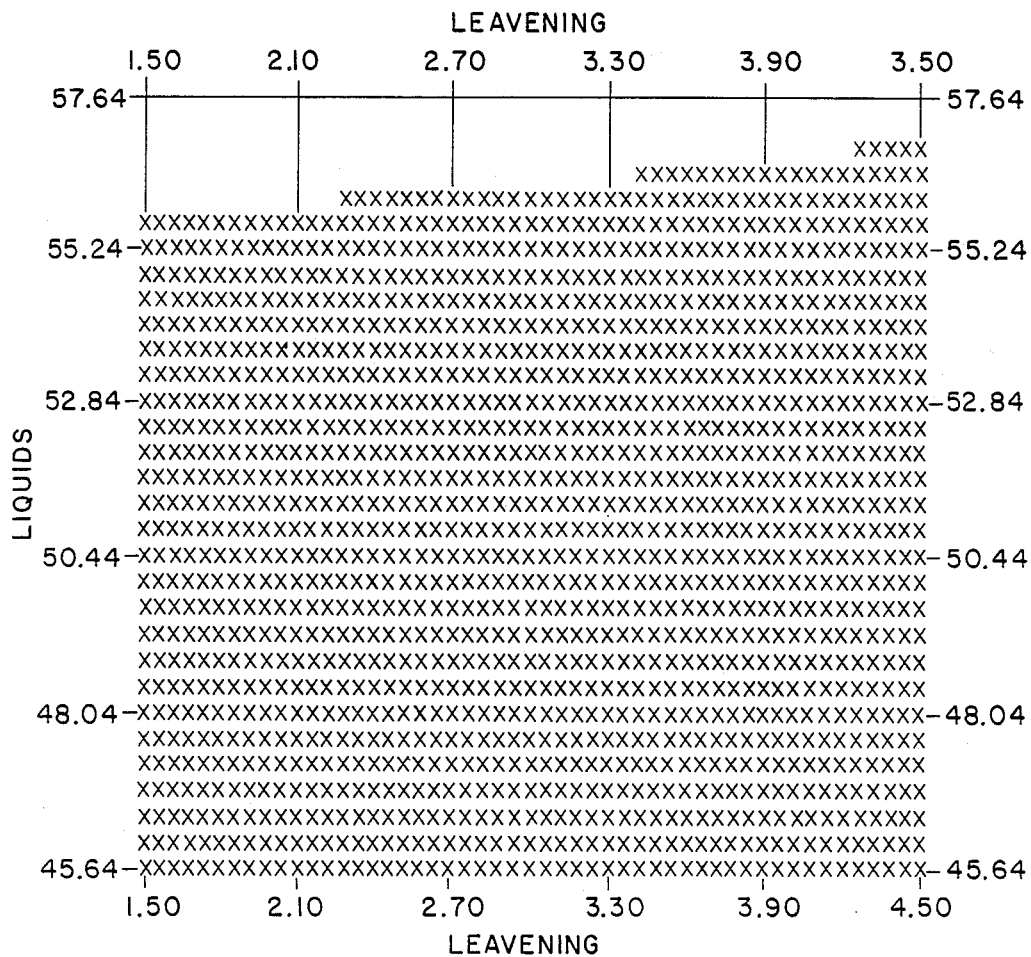
Figure 5B:
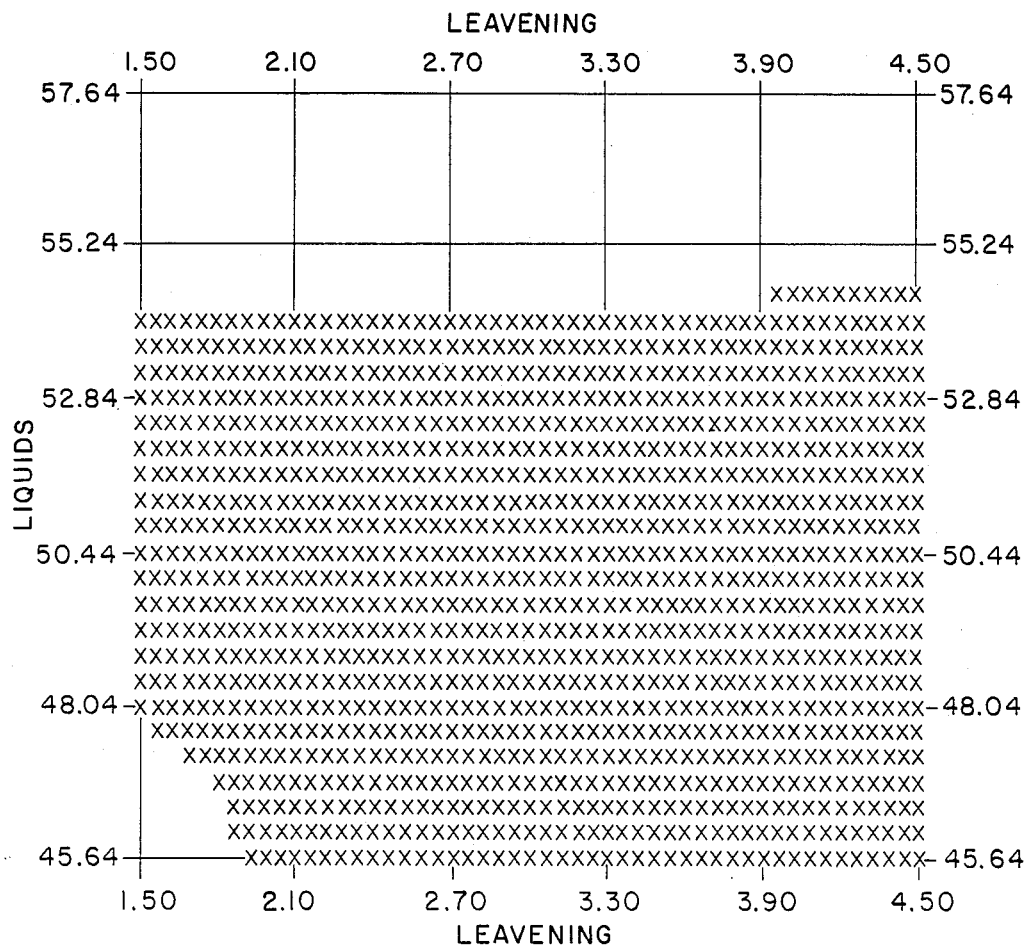
Figure 5C:
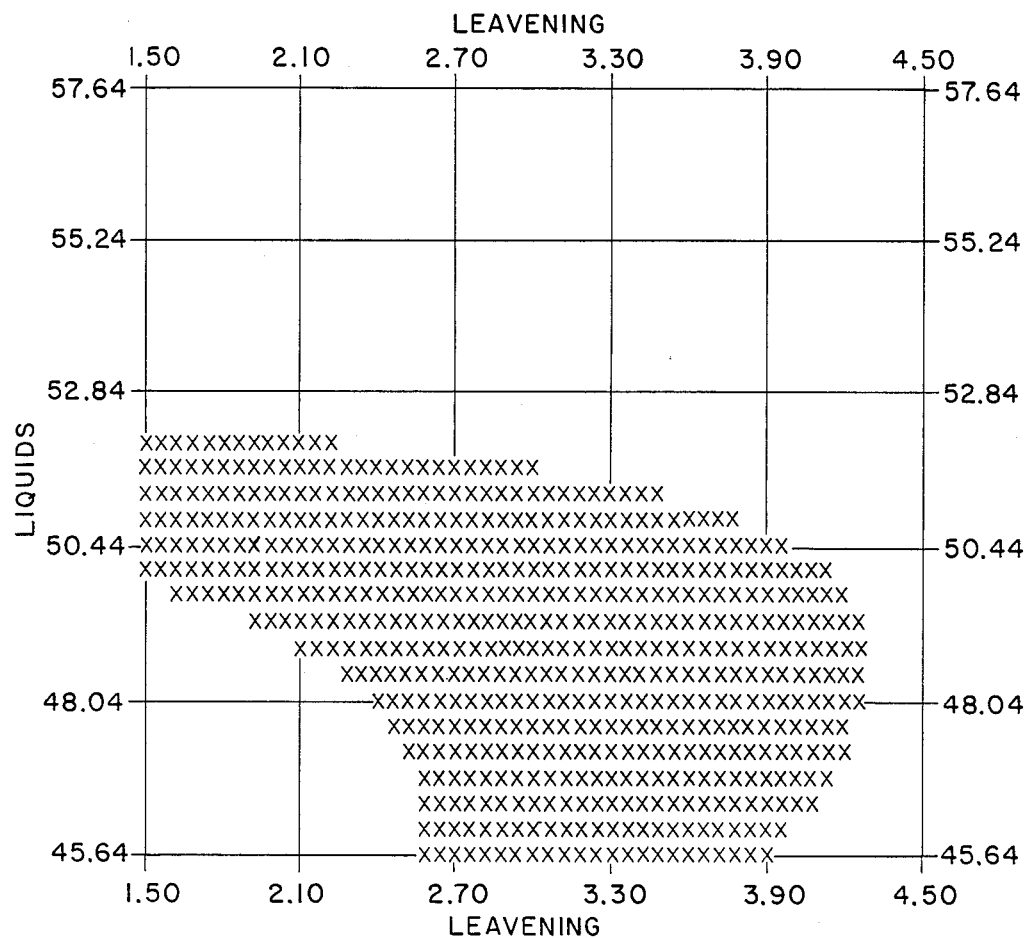

FIGS. 5A, 5B, and 5C shows a series relating total liquid addition and total leavening levels to symmetry for chocolate cakes.

Figure 6:
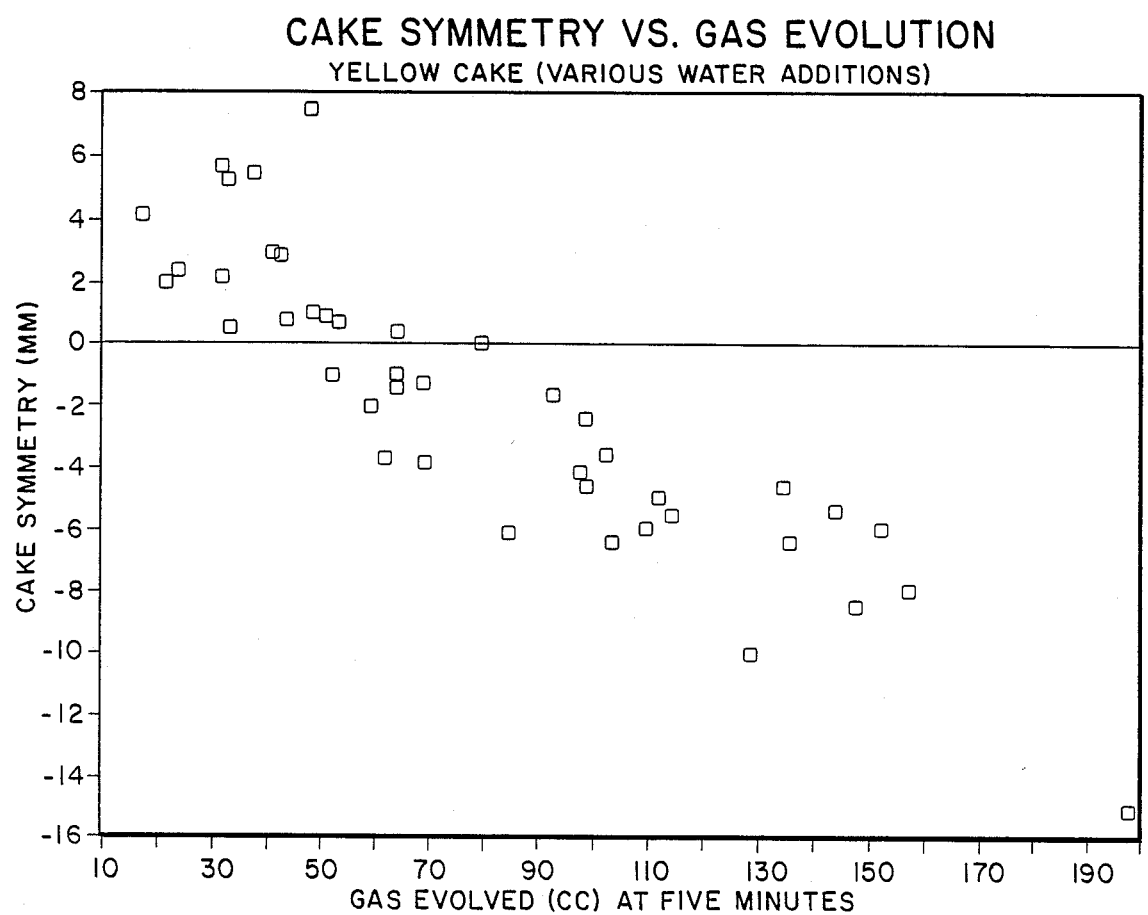

FIG. 6 shows the relationship between gas evolution and symmetry for all types of yellow cakes studied.

DETAILED DESCRIPTION OF THE INVENTION

FIG. 1 specifically shows the relationship between symmetry and gas evolution for a yellow cake mix prepared according to the recipe given herein.

FIG. 2 shows the viscosity of yellow cake mix batter prepared according to the recipe given, with time for a batter void of leavening, leavened to standard levels, and leavened at 1.5 times the control level.

Figure 3A:
FIG. 3A shows a "crowned" cake layer.
Figure 3B:
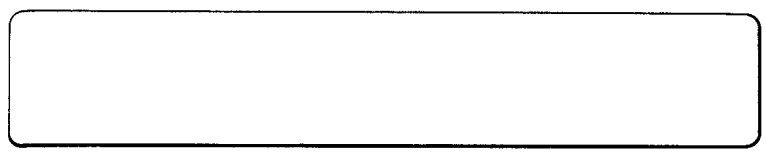
FIG. 3B shows a normal, acceptable cake layer.
Figure 3C:
FIG. 3C shows an overly leavened cake layer having negative symmetry.

FIG. 3 provides pictorial examples of symmetry. FIG. 3A shows positive symmetry, or crowning; FIG. 3B shows perfect symmetry; and FIG. 3C shows negative symmetry, or dipping.

FIG. 4A shows the response surface plot of symmetry as a function of percent total liquids (water, egg, and oil, with the ratios of liquid and ratios of leavening as given below). FIG. 4A shows the symmetry limits of −6 to 2. FIG. 4B shows the similar plot with symmetry limits −4 to 1. FIG. 4C shows a similar plot with symmetry limits −2 to 0.

In these Figures, the leavening ratio, soda:MCP:SALP was 34.95:55.34:9.71, and the liquid ratio of water:egg:oil was 55.44:19.46:25.10.

FIG. 5A shows the response surface plot of symmetry as a function of percent total liquids (water:egg:oil) and total leavening (sodium bicarbonate:MCP:SALP) in a chocolate cake mix with symmetry limits −6 to 2 in FIG. 5A; −4 to 1 in FIG. 5B, and −2 to 0 in FIG. 5C.

In these figures, the leavening ration of soda:MCP:SALP was 62.50:29.69:7.81, and the liquid ratio of water:egg:oil was 55.44:19.48:25.10.

FIG. 6 shows the symmetry versus gas evolution for a yellow cake mix prepared with low, normal, and high amounts of liquid (water, oil, egg) recipes.

The microwave cake mixes which are being commercially produced are as follows:

| Microwave Yellow Cake Mix | |
| --- | --- |
| Ingredient | Percent |
| sugar | 23.16 |
| powdered sugar | 15.44 |
| flour | 34.60 |
| hydrogenated vegetable oil | 6.24 |
| hydrolyzed cereal solids | 5.20 |
| dextrose | 3.85 |

-continued

| Microwave Yellow Cake Mix | |
|---|---|
| Ingredient | Percent |
| powdered vegetable shortening | 3.36 |
| sodium silicoaluminate | 1.60 |
| powdered PGME/mono/SSl | 1.20 |
| monocalcium phosphate | 1.14 |
| distilled mono- and diglycerides | 0.80 |
| salt | 0.80 |
| bicarbonate of soda | 0.72 |
| vanilla flavor | 0.45 |
| xanthan gum | 0.40 |
| triglycerol | 0.40 |
| yellow cake flavor | 0.28 |
| sodium aluminum phosphate | 0.20 |
| corn starch | 0.10 |
| flour enrichment | 0.03 |
| propylene glycol | 0.0053 |
| FD&C yellow number 5 | 0.0030 |
| FD&C red number 40 | 0.0002 |

| Microwave Chocolate Cake Mix | |
|---|---|
| Ingredient | Percent |
| flour | 25.94 |
| sugar | 21.12 |
| powdered sugar | 14.08 |
| dextrose | 12.08 |
| hydrogenated vegetable oil | 7.80 |
| powdered vegetable shortening | 4.00 |
| processed cocoa | 4.00 |
| processed cocoa | .4.00 |
| sodium silicoaluminate | 1.60 |
| bicarbonate of soda | 1.60 |
| vanilla flavor | 1.20 |
| salt | 0.80 |
| monocalcium phosphate | 0.76 |
| xanthan gum | 0.40 |
| sodium stearoyl lactylate | 0.40 |
| sodium aluminum phosphate | 0.20 |
| flour enrichment | 0.02 |

| Microwave Lemon Cake Mix | |
|---|---|
| Ingredient | Percent |
| flour | 34.32 |
| sugar | 23.36 |
| powdered sugar | 15.43 |
| hydrogenated vegetable oil | 6.24 |
| hydrogenated cereal solids | 5.10 |
| powdered vegetable shortening | 3.36 |
| dextrose | 3.00 |
| sodium silicoaluminate | 1.60 |
| powdered PGME/mono/SSL | 1.20 |
| monocalcium phosphate | 1.14 |
| lemon juice flavor | 1.00 |
| salt | 0.80 |
| distilled mono- and diglycerides | 0.80 |
| bicarbonate of soda | 0.72 |
| xanthan gum | 0.52 |
| vanilla flavor | 0.45 |
| triglycerol | 0.40 |
| sodium stearoyl lactyate | 0.32 |
| sodium aluminum phosphate | 0.20 |
| flour enrichment | 0.0280 |
| FD&C yellow number 5 | 0.0044 |

The major response used to quantitate the geometrical uniformity of the cakes studies is a symmetry measurement whereby the thickness of the cakes at two opposite edges is subtracted from twice the thickness in the center. This procedure is repeated six times rotating the cake 30 degrees between each measurement. The resulting symmetry value is usually expressed in millimeters. Cake volume was estimated from the averages of the three thicknesses taken during the symmetry measurement, since the diameter of the cake pan, and consequently the cakes, is constant. Gas evolution was measured using a technique employing a gasograph (Demaray Scientific Instrument, Ltd., Pullman, WA). This instrument records evolved gas with time. The product system at about 22° C. is put into a closed container in a temperature controlled water bath, maintained at 50° C. The container is connected through tubing to a piston that, in turn, drives a pen across chart paper delivered at a controlled speed. The resulting graph represents a plot of gas evolution versus time.

In the present studies, 100 grams of 22° C. batter were added to the gasograph sample jar, the connections to the gasograph recording unit were secured, and the jar was immersed in the 50° C. water bath. Gas evolution in cubic centimeters was read off the resultant chart at a point five minutes after the gasograph sample jar was stoppered. The time between the end of the mix cycle and stopping the sample jar was constant.

Viscosity measurements were taken using a Brookfield HATD Viscometer (disc #4) at 10 seconds from the point that the disk was immersed and the motor was turned on. Viscosity was reported in Brookfield units.

As stated previously, it was determined that leavening level affected cake symmetry, as shown in FIG. 1. There is clearly shown a strong correlation between gas evolution and cake symmetry as measured by the procedures described above.

It has been discovered that the rate of gas evolution affects this phenomenon through a strong relationship between gas evolution (leavening amount) and batter viscosity (cf. FIG. 2, yellow cake, normal bake). Generally, highly leavened batters have high viscosities. This relationship may be used to inhibit the flow of the cooler center during the final stages of microwave cake baking. In the case where the batter is poorly leavened, the center is very fluid in the final stages of the microwave bake, and the downward by flowing of batter flows under the previously set edge, causing a positive symmetry known as crowning, shown in FIG. 3A. Optimally leavened batters yield neutral symmetry, as shown in FIG. 3B. Overly leavened batters yield a negative symmetry, as shown in FIG. 3C. It is believed that, although these microwave baking batters have high central viscosity, the center sets with an enlarged cell structure that collapses on cooling.

It is possible to explain the effect of gas evolution of the phenomenon of contraction. In a highly leavened system, the edge areas of the layer would evolve large amounts of gas, which would tend to lower the relative dielectric constant and relative dielectric loss factor. It is believed that the dielectric properties and the thickness of a uniform layer, such as a cake batter, govern the heating rate of that layer. In general, it is believed that lower values for the dielectric parameters, especially the relative dielectric loss factor e", yield lower heating rates. Thus, a highly leavened system should heat more slowly than a lowly leavened system. Slower baking translates to higher final moisture and less contraction, particularly in the edge areas, which are highly irradiated. Less contraction around the edges tends to yield more negative symmetries and reduces the "crowning" phenomenon.

The effect on cake layer symmetry was investigated with respect to liquid addition to the batter as well as to the leavening level in the mix. FIGS. 4A, 4B, and 4C show the relationship between total liquid addition to the recipe, total percent leavening, and cake symmetry for yellow cakes with symmetry limits of −6 mm to 2 mm, −4 mm to 1 mm, and −2 mm to 0 mm, respectively. The effect of liquid addition to the batter is not highly significant for the yellow cake system. Gas evolution is a function of both of the variables studied.

In order to convert total liquid and total leavening to gas evolution units for the yellow cake system, the following equation was developed:

$$GE = (40.0)(LE) - (5.6)(LI) + (2.0)(LE^2) - (2.2)(LI^2) - (2.6)(LE)(LI) + 100.6$$

wherein gas evolution is described above, LE is total percent leavening (mix basis), and LI is the total percent liquids added to the mix during preparation (batter basis). The following ratios of liquids and leavening agents were used for the yellow cakes:
leavening ratio (soda:MCO:SALP) 34.95:55.34:9.71
liquid ratio (water:egg:oil) 55.44:19.46:25.10

Throughout the present document, all percentages are expressed as percentages by weight, unless otherwise indicated.

FIGS. 5A, 5B, and 5C show a series relating total liquid addition and total leavening level to symmetry for chocolate cakes. These figures show that percent liquid in the batter does have a significant effect on symmetry in the chocolate cake system. It also appears from these figures, showing the size of the acceptable symmetry areas defined in these figures, that the chocolate cake system is much more tolerant than the yellow cake system, by comparing FIGS. 5A, B, and C with FIGS. 4A, B, and C. It is possible that the water binding capacity of the cocoa in the chocolate cake mix formula affects the batter viscosity in a manner that contributes to this tolerance. To convert total liquid and total leavening to gas evolution units for the chocolate cake system, the following equation was developed:

$$GE = (23.5)(LE) - (1.6)(LI) + (4.6)(LE^2) + (0.4)(LE)(LI) + 65.1.$$

The following ratios of liquids and leavening agents were used for the chocolate cakes:
Leavening ratio—soda:MCP:SALP 62.50:29.69:7.81
liquid ratio—water:egg:oil 55.44:19.46:25.10

Since the yellow cake system appears to be more susceptible to symmetry deficiencies than the chocolate cake system, it is recommended that the relationship defined in FIG. 6 be used to control symmetry in general. FIG. 6 shows the relationship between gas evolution and symmetry for all yellow cakes studied (low, normal, and high liquid additions). Comparisons to FIG. 1 show that the basic relationship between gas evolution and cake symmetry was maintained through all levels of liquid addition studied for the yellow cake system. Linear regression analysis was applied to the cake data graphically illustrated in FIG. 6. The linear regression equation for this relationship is:

$$CS = -0.10 \times GE + 5.80, (r^2 = 0.80)$$

wherein CS is the cake symmetry as defined above.

Using the regression equation developed for the relationship in FIG. 6, it is possible to calculate the gas evolution (cc at 5 minutes in a 50° C. water bath) required to achieve a specific symmetry. Table 1 summaries the relationship between gas evolution, cake symmetry, and cake quality. A range of symmetry of from about −6 to about 2 is considered acceptable. Although these data were generated using the yellow cake system as described above, the acceptability limits defined will also yield acceptable chocolate cake symmetry.

TABLE 1

| Relationship Between Cake Symmetry and Gas Evolution | | |
|---|---|---|
| Cake Quality | Cake Symmetry | Gas Evolution (cc at 5 min. 50 C) |
| unacceptable | 4 | 18.0 |
| acceptable | 2 | 38.0 |
| acceptable | 0 | 58.0 |
| acceptable | −6 | 118.0 |
| unacceptable | −9 | 148.0 |
| unacceptable | −15 | 208.0 |

It can be seen from Table 1 that an acceptable cake can be obtained when the symmetry is less than about 2 and greater than about −6, which symmetry is achieved when the total gas evolved at 50° C. in 5 min/100 g is in the range of between about 38 and about 118 cc. A better cake layer is obtained when the symmetry is between about 1 and about −4, wherein the gas evolution is in the range of between about 48 cc and about 98 cc for five minutes/100 g at 50° C. The best layer is obtained when the symmetry is between about 0 and about 2 and the gas evolution is in the range about 58 and about 78 cc for five minutes at 50° C. per 100 g.

The symmetry of microwave chocolate and yellow cakes as a function of total liquid addition to the recipe and total leavening percentage used in the mix can be obtained from FIGS. 4 and 5, respectively.

All of the examples in Table 3 are based on leavening additions for the following dry mix, shown in Table 2.

TABLE 2

| Unleavened Dry Mix for Examples | |
|---|---|
| Ingredient | Percentage (as is basis) |
| flour | 35.33 |
| sugar | 39.42 |
| hydrogenated vegetable oil | 6.37 |
| hydrolyzed cereal solids | 5.31 |
| dextrose | 3.93 |
| powdered vegetable shortening | 3.43 |
| sodium silicoaluminate | 1.63 |
| PGME/monoglycerides/SSL | 1.22 |
| mono- and diglycerides | 0.82 |
| salt | 0.82 |
| vanilla flavor | 0.46 |
| xanthan gum | 0.41 |
| triglycerol | 0.41 |
| yellow cake flavor | 0.29 |
| enrichment | 0.03 |
| red #40 premix | 0.02 |

Dry mixes were compounded using the leavening percentages described in Table 3 and the unleavened dry mix described in Table 2. To prepare a cake according to the present invention, 350 grams of the unleavened dry mix and leavening agents was added to a bowl and mixed with a wire whip for 75 strokes. The following ingredients were then added to the dry mix: 73 grams whole egg, 93 grams oil, and 208 grams water (68±2° F.). The batter was mixed with a Hobart Kitchen Aide mixer at speed setting 1 for one minute. The batter was then split, and 100 grams was added to the gasograph sample jar for gas evolution evaluation. Another 497 gram portion of the batter was added to a greased microwave cake pan and baked in a 700 watt microwave oven on high power for seven minutes. Viscosity readings were recorded on the remaining batter. After being baked, the cake was inverted, removed from the pan, and allowed to cool for 1-2 hours. Symmetry and volume measurements were taken on the cooled cake.

The resultant batter gas evolution and cake symmetry data are shown in Table 3.

TABLE 3

Gas Evolution and Cake Symmetry for Selected Leavening Systems

| Example | Leavening Agents (% of total dry mix) | | | Cake Symmetry | Gas Evolution (cc at 5 min. 50 C) |
|---|---|---|---|---|---|
| | NaHCO³ | MCP | SALP | | |
| 1 | 0.40 | 0.00 | 1.00 | 5.7 | 32.1 |
| 2 | 0.72 | 0.30 | 0.00 | 3.0 | 41.7 |
| 3 | 0.72 | 1.56 | 0.00 | 0.0 | 79.7 |
| 4 | 1.20 | 1.50 | 1.00 | −6.0 | 109.5 |
| 5 | 1.20 | 3.00 | 2.00 | −8.5 | 147.6 |
| 6 | 2.00 | 3.00 | 1.00 | −15.1 | 197.5 |

A cake mix can be formulated for microwave baking comprising, by weight of mix:
from about 60% to about 85% sugar and flour, the ratio of sugar to flour being from about 1:1 to 2:1;
from about 1% to about 5% leavening;
from 0% to about 30% and preferably from about 10% to about 20% fat;
the balance being conventional cake additives.

When water and eggs are added to this dry mix, a batter is formed which can be baked in a microwave oven to form a moist, tender consumer-acceptable cake with acceptable symmetry.

The term "conventional cake additives" includes ingredients such as flavors, thickeners, nutrients, antioxidants and antimicrobial agents, nonfat milk solids, egg solids, starches, etc.

Nonfat milk solids which can be used in the cake mixes of the present invention are the solids of skim milk and include proteins, mineral matter, and milk sugar. Other proteins such as casein, sodium caseinate, calcium caseinate, modified casein, sweet dairy whey, modified whey, and whey protein concentrate can also be used herein. Generally, these solids will be used from about 1% to about 10% by weight of the dry mix.

For many mixes it is accepted practice for the user to add the required amount of eggs in the course of preparation, and this practice may be followed with the mixes of the present invention. If desired, however, egg solids, particularly egg albumen and dried yolk, may be included in the mix. Soy isolates may also be used herein in place of the egg albumin.

Dry or liquid flavoring agents may be added to the mix. These include cocoa, vanilla, chocolate, coconut, peppermint, pineapple, cherry, nuts, spices, salts, flavoring enhancers, and the like. Any suitable flavoring agent used to prepare baked goods can be used herein.

As used herein, cakes and baked goods includes cakes, cupcakes, and other types of baked goods which would ordinarily contain a leavening agent.

The ordinary granulated sugars are quite satisfactory for use herein. These include sucrose, dextrose, maltose, fructose, lactose, brown and invert sugars, alone, or in combination.

Artificial sweeteners can also be used in the mixes of the present invention, as can the sugar alcohols such as xylitol and mannitol.

The flour used in the mix can be the usual bleached cake flour, although a good general-purpose flour can be substituted therefore. Flours which have been treated in other manners, to produce flours of the quality of bleached cake flour, are also acceptable. Flour can be enriched with additional vitamins and minerals.

The sugar and flour can be mixed with the other ingredients in a conventional manner. Any batchwise conventional system for preparing cake mixes can be used herein.

The symmetry of the baked cake layer is controlled by controlling the leavening system. The typical leavening system comprises a baking soda such as sodium potassium, or ammonium bicarbonate, and a baking acid, preferably either sodium aluminum phosphate and monocalcium phosphate, or mixtures thereof. Of course, any leavening system can be used that produces the desired gas evolution for processing of symmetry of the baked layer. The amounts of the leavening ingredients are preferably within the following ranges:

from about 0.5% soda and 0.4% acid, expressed as a percentage of the dry mix to about 3.1% soda and 1.9% acid for chocolate cakes and, from about 0.3% soda and 0.7% acid to about 1.8% soda and 3.2% acid for yellow cakes.

Alternatively, this may be expressed as about 62:30:8 soda:MCP:SALP for chocolate cakes, and about 35:55:10 for yellow cakes.

The fat or shortening suitable for use herein can be plastic or fluid. A major part of the fat is usually a liquid oil.

The oil portion of the fat can be derived from naturally occurring liquid triglyceride oils such as cottonseed oil, soybean oil, peanut oil, rapeseed oil, sesame seed oil, coconut oil, corn oil, and sunflower seed oil. Other suitable oils are the liquid oil fractions obtained from palm oil, lard, and tallow, as for example, by graining or directed interesterification, followed by separation of the oil. Oils predominating in glycerides of unsaturated acids may require some hydrogenation to maintain flavor.

Of course, mixtures of the above oils or of other oils can also be used in the mixes of the present invention, as can solid fatty materials, such as saturated triglyceride fats. In general, from about 1.5% to about 20% of triglycerides which are solid at 25° C. can be added to a liquid oil. At least about 80% of the fatty glycerides should be in a beta phase.

Fish oils such as herring, menhaden, and whale oil can also be used herein.

The preferred fats are soybean oil, hydrogenated soybean oil, corn oil, palm oil, hydrogenated palm oil, lard, and tallow oils.

To produce a cake mix, the flour, sugar, leavening agent, fat, and additional ingredients are mixed together in a conventional manner to produce the cake mix. The cake can be made in accordance with the teaching of Citti et al., Ser. No. 55,852, filed June 1, 1987, entitled, Microwave Cake Mix and Method of Manufacture, and Moder et al., Ser. No. 110,469 filed Oct. 20, 1987, entitled Self-Topping Cake, both of which applications are incorporated herein by reference. For example, the fat and other ingredients can be combined with the sugar and flour by admixing these components in a planetary bowl mixer, a ribbon blender, a high-speed rotary mixer, or in other conventional mixers. Preferably, however, the shortening is mixed with the sugar-flour-leavening agent mixture in a paddle mixer, a ribbon blender, or a high-speed rotary mixer to form an essentially homogeneous blend, and then the additional ingredients are admixed, also in a conventional mixer, with this blend.

A batter is prepared from the culinary mix of the present invention by combining it with aqueous ingredients such as water or milk and eggs in a home or industrial process. For an even moister cake, additional oil can be added to the batter. The batter comprises from about 40% to about 60% of the dry mix, from about 30% to about 60% total water, from about 5% to about 15% whole eggs, or its equivalent in eggs solids or proteins, and from about 10% to about 16% additional fat, e.g., vegetable or animal oil, for a total fat content in the range of between about 10% and about 30%.

The batter resulting from this mixing process is poured into a cake pan and baked in a microwave oven to produce a cake.

Two frequencies are available for microwave cooking, 915±25 megahertz, and 2450±50 megahertz. It is preferable to use microwave frequencies of 2450±50 megacycles for the practice of the present invention.

The exact cooking time will depend upon the frequency of the microwave energy used, and the amount of batter used.

All types of the flavor and sugar-based prepared cake mixes can be made in a microwave oven according to the present invention. Yellow cakes, chocolate cakes, devil's food cakes, marble cakes, spice cakes, pineapple cakes, and many other layer cakes of excellent quality can be prepared simply by adding water and eggs to the dry mix in a single mixing step or multiple mixing steps, followed by microwave baking.

It is a particular advantage of the present invention that the ingredients can be conveniently provided to the consumer in such a way as to make it especially convenient for the consumer to make consistently good microwave baked cakes.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiment. It is to be understood that the phraseology or terminology employed herein is for the purpose of description and not of limitation.

What is claimed is:

1. A method for controlling the symmetry of a baked cake layer which is baked from a starch-based batter in a microwave oven comprising:
    (a) placing cake batter in a microwave oven, said batter having a leavening system effective to provide a gas evolution in the range of between about 38 cc and about 118 cc; and
    (b) thereafter baking the batter by exposing same to microwave energy.

2. The method of claim 1 wherein the gas evolution is in the range of between about 48 cc and about 98 cc.

3. The method of claim 2 wherein the gas evolution is in the range of between about 58 cc and about 78 cc.

4. A method for making a cooked good with controlled symmetry from a starch-based batter by heating the batter with microwave radiation, said method comprising:
    (a) forming a batter from a mix comprising:
        (1) from about 60% to about 85% by weight of a mixture of sugar and flour; and
        (2) a sufficient amount of a leavening system effective to provie a gas evolution in the range of between about 38 cc and about 118 cc;
    (b) introducing the batter into a baking pan; and
    (c) exposing said batter to microwave radiation for a time period sufficient to set the structure of said batter and thereby form a cooked good.

5. The mix of claim 4 wherein the leavening system is effective to provide a gas evolution in the range of between about 48 cc and about 98 cc.

6. The mix of claim 5 wherein the leavening system is effective to provide a gas evolution in the range of between about 58 cc and about 78 cc.

7. The mix of claim 4 wherein the leavening comprises a mixture of sodium bicarbonate, monocalcium phosphate and sodium aluminum phosphate in a ratio of about 62:30:8 by weight, and the mix is for a chocolate cake.

8. The culinary mix of claim 4 wherein the leavening comprises a mixture of sodium bicarbonate, monocalcium phosphate and sodium aluminum phosphate in a ratio of about 35:55:10, and the mix is for a yellow cake.

9. A method of making a cooked good with controlled symmetry from a batter, said method comprising:
    (a) forming a batter comprising:
        (1) sugar and flour whose combined weight is in the range of between about 40% and about 60% by weight of batter;
        (2) total water in the range of between about 30% and about 60% by weight of batter;
        (3) fat in the range of between about 10% and about 30% by weight of batter; and
        (4) sufficient leavening effective to provide a gas evolution in the range of between about 38 cc and about 118 cc;
    (b) introducing said batter into a baking pan; and
    (c) exposing said batter to microwave radiation for a time period sufficient to set the structure of said batter and thereby form a cooked good.

10. The batter of claim 9 wherein the leavening is sufficient to provide a gas evolution in the range of between about 48 cc and about 98 cc.

11. The batter of claim 10 wherein the leavening is sufficient to provide a gas evolution in the range of between about 58 cc and about 78 cc.

12. The batter of claim 9 wherein the leavening comprises a mixture of sodium bicarbonate, monocalcium phosphate and sodium aluminum phosphate.

13. The batter of claim 12 wherein the leavening comprises a mixture of sodium bicarbonate, monocalcium phosphate and sodium aluminum phosphate in a ratio of about 62:30:8 by weight, and the batter is for a chocolate cake.

14. The batter of claim 12 wherein the leavening comprises a mixture of sodium bicarbonate, monocalcium phosphate and sodium aluminum phosphate in a ratio of about 35:55:10 by weight, and the mix is for a yellow cake.

* * * * *